United States Patent
Varghese et al.

(10) Patent No.: US 11,521,792 B2
(45) Date of Patent: Dec. 6, 2022

(54) WIRELESS POWER TRANSFER WITH ACTIVE FIELD CANCELLATION USING MULTIPLE MAGNETIC FLUX SINKS

(71) Applicant: Utah State University, Logan, UT (US)

(72) Inventors: Benny J. Varghese, Logan, UT (US); Abhilash Kamineni, North Logan, UT (US); Regan A. Zane, Hyde Park, UT (US)

(73) Assignee: Utah State University, Logan, UT (US)

( * ) Notice: Subject to any disclaimer, the term of this patent is extended or adjusted under 35 U.S.C. 154(b) by 0 days.

(21) Appl. No.: 17/023,204

(22) Filed: Sep. 16, 2020

(65) Prior Publication Data

US 2021/0082617 A1    Mar. 18, 2021

Related U.S. Application Data

(60) Provisional application No. 62/901,104, filed on Sep. 16, 2019.

(51) Int. Cl.
*H01F 27/34*     (2006.01)
*H01F 27/28*     (2006.01)
(Continued)

(52) U.S. Cl.
CPC .......... *H01F 27/346* (2013.01); *B60L 53/122* (2019.02); *H01F 27/28* (2013.01); *H01F 38/14* (2013.01); *H02J 50/10* (2016.02)

(58) Field of Classification Search
CPC ........ H01F 27/346; H01F 27/28; H01F 38/14; H01F 27/366; H01F 27/38; B60L 53/122;
(Continued)

(56) References Cited

U.S. PATENT DOCUMENTS 9,318,258 B2 *   4/2016   Yamakawa  ............. H02J 7/025
2009/0079426 A1 *  3/2009   Anderson   ........  G01R 31/31709
                                                                324/301
(Continued)

FOREIGN PATENT DOCUMENTS

CN          109515219 A   *   3/2019

OTHER PUBLICATIONS

Campi, "Active Coil System for Magnetic Field Reduction in an Automotive Wireless Power Transfer System," 2019 IEEE International Symposium on Electromagnetic Compatibility, Signal & Power Integrity (EMC+SIPI), pp. 189-192, Jul. 2019 (Year: 2019).*

(Continued)

*Primary Examiner* — Pinping Sun
(74) *Attorney, Agent, or Firm* — Kunzler Bean & Adamson; Bruce R. Needham

(57) ABSTRACT

A wireless power transfer pad for wireless power transfer with active field cancellation using multiple magnetic flux sinks includes a ferrite structure, a center coil positioned adjacent to the ferrite structure, and a plurality of side coils positioned around a perimeter of the center coil and positioned adjacent to the ferrite structure. A direction of current flow of the center coil is opposite a current flow in each of the plurality of side coils such that current flowing in a portion of the center coil adjacent to a portion of a side coil of the plurality of side coils is in a same direction as current in the portion of the side coil.

19 Claims, 7 Drawing Sheets

(51) Int. Cl.
*B60L 53/122* (2019.01)
*H02J 50/10* (2016.01)
*H01F 38/14* (2006.01)

(58) Field of Classification Search
CPC ........ H02J 50/10; H02J 50/005; H02J 50/402; Y02T 10/70; Y02T 10/7072; Y02T 90/14
See application file for complete search history.

(56) References Cited

U.S. PATENT DOCUMENTS

| | | | | |
|---|---|---|---|---|
| 2013/0009462 A1* | 1/2013 | Amano | ............... | H01F 38/14 307/9.1 |
| 2013/0038281 A1* | 2/2013 | Sakakibara | ............ | H02J 50/12 320/108 |
| 2013/0088090 A1* | 4/2013 | Wu | ........................ | H01F 3/08 336/84 R |
| 2014/0043127 A1* | 2/2014 | Worek | ................... | H01F 27/38 336/178 |
| 2014/0318912 A1* | 10/2014 | Woronowicz | ........ | H02J 50/005 191/10 |
| 2015/0236513 A1* | 8/2015 | Covic | .................... | H02J 50/10 307/104 |
| 2017/0187209 A1* | 6/2017 | Yao | ......................... | H02J 7/025 |
| 2019/0199144 A1* | 6/2019 | Jadidian | ................ | H02J 50/10 |
| 2019/0371515 A1* | 12/2019 | Ha | ......................... | H02J 50/70 |
| 2020/0203992 A1* | 6/2020 | Covic | .................... | H02J 50/70 |

OTHER PUBLICATIONS

Tafur, "Right-Hand Rules: A Guide to finding the Direction of the Magnetic Force," 2018, pp. 1-4, (Year: 2018).*

Zhu, "Null-Coupled Electromagnetic Field Canceling Coil for Wireless Power Transfer System," IEEE Transactions on Transportation Electrification, vol. 3, No. 2, Jun. 2017 (Year: 2017).*

Veda Prakash Galigekere et. al., Design and Implementation of an Optimized 100 kW Stationary Wireless Charging System for EV Battery Recharging, IEEE Conversion Congress and Exposition, Sep. 23-27, 2018, pp. 1-6.

Grant A. Covic et. al., Inductive Power Transfer, Proceedings of the IEEE, Jun. 2013, pp. 1-14.

Mickel Budhia et. al., Design and Optimization of Circular Magnetic Structures for Lumped Inductive Power Transfer Systems, IEEE Transactions on Power Electronics, vol. 26, No. 11, Nov. 2011, pp. 1-13.

Faical Turki et. al., Performance of Wireless Charging System based on Quadrupole Coil Geometry with different Resonance Topology Approaches, IEEE PELS Workshop on Emerging Technologies: Wireless Power Transfer (WoW), Oct. 4-6, 2016, pp. 1-6.

Roman Bosshard et al., Comprehensive Evaluation of Rectangular and Double-D Coil Geometry for 50 kW/85 kHz IPT System, IEEE Journal of Emerging and Selected Topics in Power Electronics, vol. 4, No. 4, Dec. 2016, pp. 1-10.

Adeel Zaheer et. al., Investigation of Multiple Decoupled Coil Primary Pad Topologies in Lumped IPT Systems for Interoperable Electric Vehicle Charging, IEEE Transactions on Power Electronics, vol. 30, No. 4, Apr. 2015, pp. 1-19.

Seho Kim et. al., Tripolar Pad for Inductive Power Transfer Systems for EV Charging, IEEE Transactions on Power Electronics, vol. 32, No. 7, Jul. 2017, pp. 1-13.

Benny J. Varghese et al., Design and Optimization of Decoupled Concentric and Coplanar Coils for WPT Systems, IEEE Wireless Power Transfer Conference (WPTC), May 10-17, 2017, pp. 1-4.

Chargepoint, ChargePoint Express Plus, https://www.chargepoint.com/products/commercial/express-plus/, Known as early as Sep. 16, 2019 downloaded Sep. 16, 2020, pp. 1-3.

Charles Morris, WAVE demonstrates 250kW wireless en route charging for e-buses, https://chargedevs.com/newswire/wave-demonstrates-250-kw-wireless-en-route-charging-for-e-buses/, Mar. 14, 2017, pp. 1-9.

* cited by examiner

WIRELESS POWER TRANSFER WITH ACTIVE FIELD CANCELLATION USING MULTIPLE MAGNETIC FLUX SINKS

CROSS-REFERENCES TO RELATED APPLICATIONS

This application claims the benefit of U.S. Provisional Patent Application No. 62/901,104 entitled "Wireless Inductive Power Transfer Apparatus with Active Field Cancellation Using Multiple Magnetic Flux Sinks" and filed on Sep. 16, 2019 for Benny J. Varghese et al., which is incorporated herein by reference.

FIELD

This invention relates to wireless power transfer and more particularly relates to active field cancellation for a wireless power transfer pad.

BACKGROUND

Wireless power transfer ("WPT") is used to transfer power from a primary pad to a secondary pad typically over an air gap. Wireless power transfer is currently being used to transfer power to a vehicle without the need to plug in the vehicle. Wireless power transfer may also be used to transfer power to a vehicle while the vehicle is moving. Efficiency in the WPT process is important for safety as well as for reducing power loss.

SUMMARY

A WPT pad for wireless power transfer with active field cancellation using multiple magnetic flux sinks includes a ferrite structure, a center coil positioned adjacent to the ferrite structure, and a plurality of side coils positioned around a perimeter of the center coil and positioned adjacent to the ferrite structure. A direction of current flow of the center coil is opposite a current flow in each of the plurality of side coils such that current flowing in a portion of the center coil adjacent to a portion of a side coil of the plurality of side coils is in a same direction as current in the portion of the side coil.

Another WPT pad for wireless power transfer with active field cancellation using multiple magnetic flux sinks includes a ferrite structure comprising a planar surface, a center coil positioned adjacent to the ferrite structure, and a plurality of side coils positioned around a perimeter of the center coil and positioned adjacent to the ferrite structure. The center coil and the plurality of side coils are wound parallel to the planar surface of the ferrite structure and a side of each of the plurality of side coils is next to the center coil and the side coils are evenly spaced around the center coil. A direction of current flow of the center coil is opposite a current flow in each of the plurality of side coils such that current flowing in a portion of the center coil adjacent to a portion of a side coil of the plurality of side coils is in a same direction as current in the portion of the side coil. For each side coil of the plurality of side coils, a product of current in the center coil and a number of turns of the center coil is equal to or greater than a product of current in a side coil of the plurality of side coils and a number of turns of the side coil.

A system for wireless power transfer with active field cancellation using multiple magnetic flux sinks includes a ferrite structure, a center coil positioned adjacent to the ferrite structure, and a plurality of side coils positioned around a perimeter of the center coil and positioned adjacent to the ferrite structure. A direction of current flow of the center coil is opposite a current flow in each of the plurality of side coils such that current flowing in a portion of the center coil adjacent to a portion of a side coil of the plurality of side coils is in a same direction as current in the portion of the side coil. The system includes a converter connected to the center coil and each of the plurality of side coils. The converter provides current to the center coil and each of the plurality of side coils and the converter controls current to the center coil and plurality of side coils.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
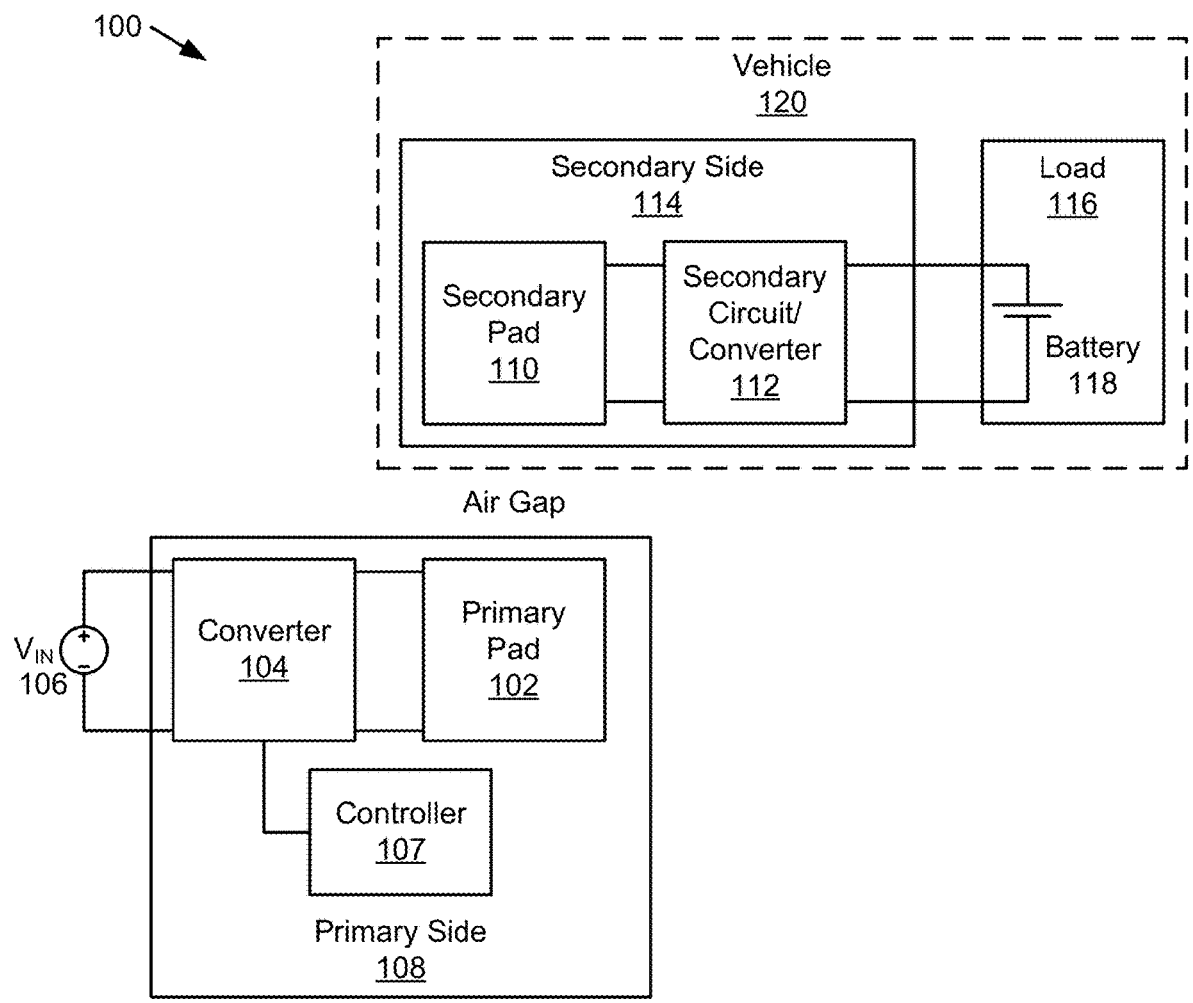
FIG. 1 is a schematic block diagram illustrating one embodiment of a system for wireless power transfer with active field cancellation using multiple magnetic flux sinks.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A WPT pad for wireless power transfer with active field cancellation using multiple magnetic flux sinks includes a ferrite structure, a center coil positioned adjacent to the ferrite structure, and a plurality of side coils positioned around a perimeter of the center coil and positioned adjacent to the ferrite structure. A direction of current flow of the center coil is opposite a current flow in each of the plurality of side coils such that current flowing in a portion of the center coil adjacent to a portion of a side coil of the plurality of side coils is in a same direction as current in the portion of the side coil.

In some embodiments, the ferrite structure includes a planar surface and the center coil and the plurality of side coils are wound parallel to the planar surface. In other embodiments, for each side coil of the plurality of side coils, a product of current in the center coil and a number of turns of the center coil is equal to or greater than a product of current in a side coil of the plurality of side coils and a number of turns of the side coil. In other embodiments, the direction of current flow of the center coil being opposite the current flow in each of the plurality of side coils includes current in the center coil being 180 degrees out of phase with current in each of the plurality of side coils. In other embodiments, the center coil is in a square or rectangular shape in a direction planar to the ferrite structure and has four sides and the plurality of side coils includes four side coils and each side coil is positioned on a side of the center coil.

In some embodiments, the center coil is circular and each of the plurality of side coils are arc-shaped and are spaced in a circular pattern around the center coil. In other embodiments, a side of each of the plurality of side coils is next to the center coil and the side coils are evenly spaced around the center coil. In other embodiments, a converter is connected to the center coil and each of the plurality of side coils. The converter provides current to the center coil and each of the plurality of side coils and the converter controls current to the center coil and plurality of side coils. In other embodiments, the center coil and the plurality of side coils are connected in series. In other embodiments, the converter includes a first converter section that provides current to the center coil and a second converter section that provides current to the plurality of side coils. A current output of the first converter section is equal to or greater than a current output of the second converter section and wherein the current output of the second converter section is split equally between the plurality of side coils.

In some embodiments, the WPT pad includes a position sensor configured to sense offset of a receiver with respect to the center coil in a direction away from a center of the center coil, and a field modifier configured to reduce current in a side coil of the plurality of side coils in the direction of the offset of the receiver and to increase current in a side coil of the plurality of side coils opposite the direction of the offset of the receiver. In other embodiments, the offset of the receiver is in a direction from the center of the center coil and forms a first direction vector with an angle that is between two vectors toward each of two side coils of the plurality of side coils and the field modifier reduces current in the two side coils, and wherein a second direction vector opposite the first direction vector is between two vectors toward each of two additional side coils of the plurality of side coils and the field modifier increases current in the two additional side coils.

Another WPT pad for wireless power transfer with active field cancellation using multiple magnetic flux sinks includes a ferrite structure comprising a planar surface, a center coil positioned adjacent to the ferrite structure, and a plurality of side coils positioned around a perimeter of the center coil and positioned adjacent to the ferrite structure. The center coil and the plurality of side coils are wound parallel to the planar surface of the ferrite structure and a side of each of the plurality of side coils is next to the center coil and the side coils are evenly spaced around the center coil. A direction of current flow of the center coil is opposite a current flow in each of the plurality of side coils such that current flowing in a portion of the center coil adjacent to a portion of a side coil of the plurality of side coils is in a same direction as current in the portion of the side coil. For each side coil of the plurality of side coils, a product of current in the center coil and a number of turns of the center coil is equal to or greater than a product of current in a side coil of the plurality of side coils and a number of turns of the side coil.

In some embodiments, for a switching frequency of current in the center coil and the plurality of side coils. The direction of current flow of the center coil being opposite the current flow in each of the plurality of side coils includes current in the center coil being 180 degrees out of phase with current in each of the plurality of side coils. In other embodiments, the WPT pad includes a converter connected to the center coil and each of the plurality of side coils. The converter provides current to the center coil and each of the plurality of side coils and the converter controls current to the center coil and plurality of side coils.

In some embodiments, the center coil and the plurality of side coils are connected in series. In other embodiments, the converter includes a first converter section that provides current to the center coil and a second converter section that provides current to the plurality of side coils. A current output of the first converter section is equal to or greater than a current output of the second converter section and the current output of the second converter section is split equally between the plurality of side coils.

In some embodiments, the WPT pad includes a position sensor configured to sense offset of a receiver with respect to the center coil in a direction away from a center of the center coil, and a field modifier configured to reduce current in a side coil of the plurality of side coils in the direction of the offset of the receiver and to increase current in a side coil of the plurality of side coils opposite the direction of the offset of the receiver. In other embodiments, the offset of the receiver is in a direction from the center of the center coil and forms a first direction vector with an angle that is between two vectors toward each of two side coils of the plurality of side coils and the field modifier reduces current in the two side coils. A second direction vector opposite the first direction vector is between two vectors toward each of two additional side coils of the plurality of side coils and the field modifier increases current in the two additional side coils.

A system for wireless power transfer with active field cancellation using multiple magnetic flux sinks includes a ferrite structure, a center coil positioned adjacent to the ferrite structure, and a plurality of side coils positioned around a perimeter of the center coil and positioned adjacent to the ferrite structure. A direction of current flow of the center coil is opposite a current flow in each of the plurality of side coils such that current flowing in a portion of the center coil adjacent to a portion of a side coil of the plurality of side coils is in a same direction as current in the portion of the side coil. The system includes a converter connected to the center coil and each of the plurality of side coils. The converter provides current to the center coil and each of the plurality of side coils and the converter controls current to the center coil and plurality of side coils.

FIG. 1 is a schematic block diagram illustrating one embodiment of a system 100 for wireless power transfer with active field cancellation using multiple magnetic flux sinks. The system 100 includes a primary pad 102 for wireless power transfer, a converter 104 fed by a power source 106, and a controller 107 on a primary side 108, a secondary pad 110 and a secondary circuit/converter 112 on a secondary side 114, a load 116, a battery 118 and a vehicle 120, which are described in more detail below.

The primary pad 102 is for wireless power transfer with active field cancellation using multiple magnetic flux sinks, which is explained in more detail with regard to FIGS. 2A-2C, 3-9 below. The primary pad 102 receives power from a converter 104, which provides alternating current ("AC") current and voltage. The converter 104 is typically a switching converter with semiconductor switches, such as insulated-gate bipolar-transistor ("IGBT") switches, metal-oxide semiconductor field-effect transistor ("MOSFET") switches, or the like. The converter 104, in some embodiments, converts incoming AC power from a power source 106 to DC and then uses a switching rectifier, such as an H-bridge, to generate AC waveforms at a particular switching frequency. The converter 104 may include inductors and/or capacitors in addition to a switching section with the semiconductor switches. In some embodiments, the converter 104 receives DC power from the power source 106. The converter 104 splits current to the primary pad 102 into current for a center coil and two or more side coils, as described below.

The switching in the converter 104 is controlled with a controller 107. Typically, the controller 107 adjusts switching to control power to the primary pad 102 depending on power needs of the load 116 and may adjust switching based on various conditions, such as alignment between the primary pad 102 and secondary pad 110. The controller 107 may also control current sharing between the center coil and side coils of the primary pad 102.

The secondary pad 110 and/or associated equipment, such as the secondary circuit/converter 112, load 116, etc. may be termed herein as a receiver. The secondary pad 110 is designed to receive power via wireless power transfer from the primary pad 102 through magnetic coupling. The secondary circuit/converter 112 receives power from the secondary pad 110 and processes the power for deliver to the load 116. In some embodiments, the secondary circuit/converter 112 is a passive device, such as a diode rectifier. In other embodiments, the secondary circuit/converter 112 is an active device, with or without a control loop, that includes semiconductor switches. In some embodiments, the system 100 is bidirectional and the secondary pad 110 transmits power to the primary pad 102.

In some embodiments, the load 116 includes a battery 118. The battery 118 may be used to provide power to a motor, such as an electric motor of a vehicle 120. In some embodiments, the secondary circuit/converter 112 provides power to the battery 118 as well as to other loads, such as a motor. In other embodiments, the secondary pad 110, secondary circuit/converter 112 and load 116 are on a mobile device that is not a vehicle. The vehicle 120 may be an automobile, a truck, a forklift, etc.

Efficient power transfer during wireless power transfer between the primary pad 102 and secondary pad 110 is desirable. The primary pad 102 is shaped to direct electromagnetic flux in a direction of the secondary pad 110. Leakage flux that does not link to the secondary pad 110 is undesirable. For example, leakage flux may result in power loss. In addition, leakage flux is undesirable for safety reasons and most jurisdictions have regulations regarding leakage flux in terms of a maximum magnetic field strength at a particular distance from a magnetic flux source, such as a primary pad 102. Where the secondary pad 110 transmits power, the same principles and regulations apply as for the primary pad 102.

Figure 2A:
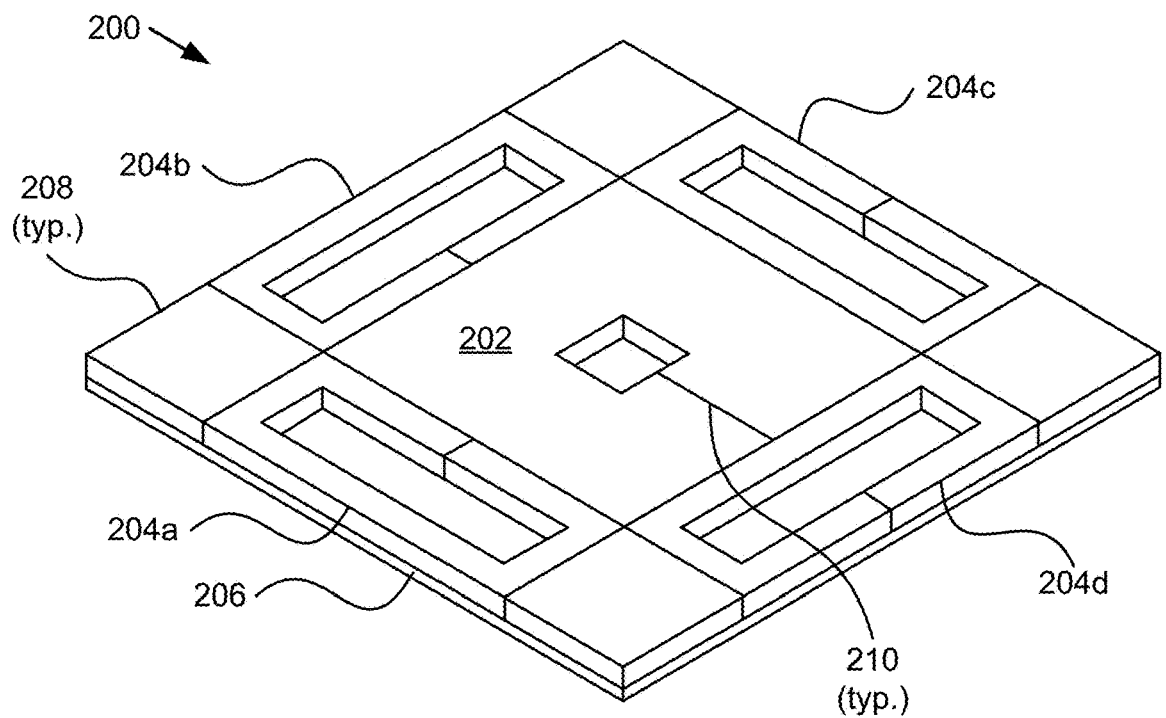
FIG. 2A is a perspective view illustrating one embodiment of a wireless power transfer ("WPT") pad for wireless power transfer with active field cancellation using multiple magnetic flux sinks.
Figure 2B:
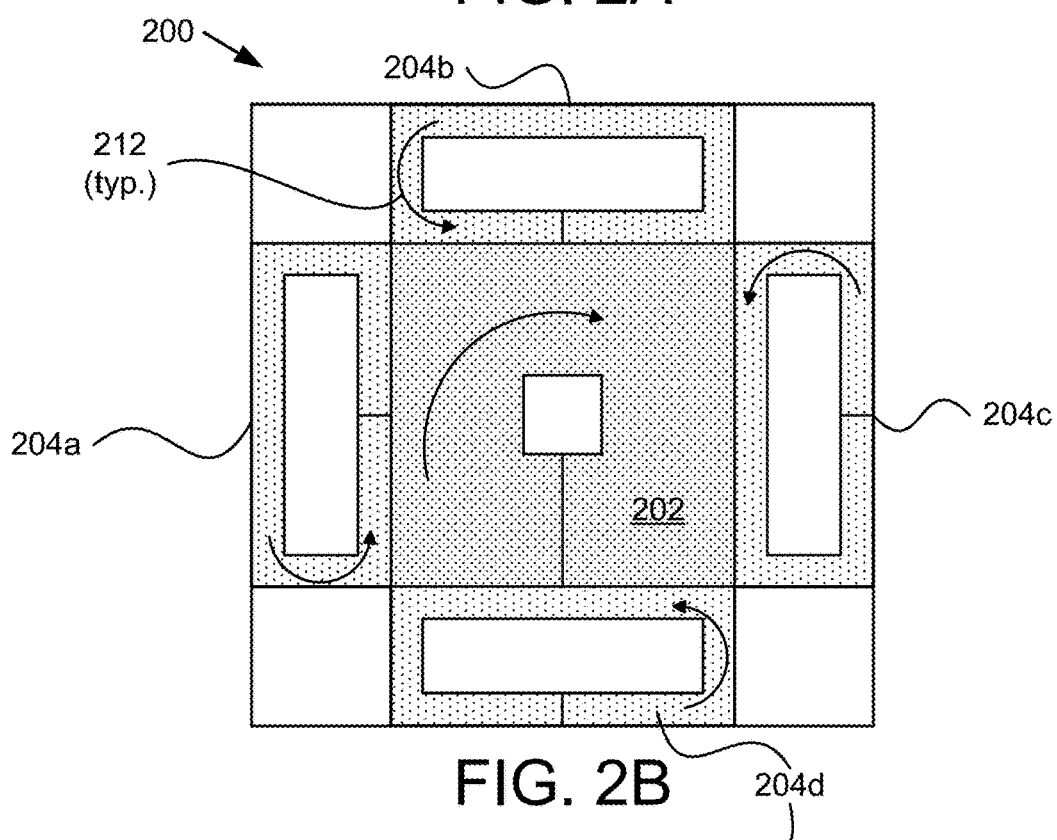
FIG. 2B is a top view further illustrating the WPT pad of FIG. 2A.
Figure 2C:
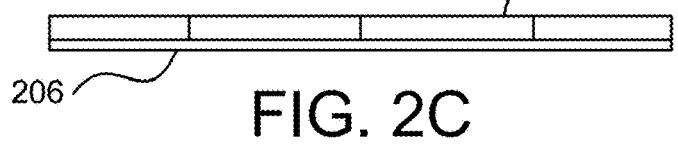
FIG. 2C is a side view further illustrating the WPT pad of FIG. 2A.

FIG. 2A is a perspective view illustrating one embodiment of a wireless power transfer ("WPT") pad 200 for wireless power transfer with active field cancellation using multiple magnetic flux sinks. FIG. 2B is a top view further illustrating the WPT pad 200 of FIG. 2A and FIG. 2C is a side view further illustrating the WPT pad 200 of FIG. 2A. The WPT pad 200, in some embodiments, is substantially similar to the primary pad 102 and/or secondary pad 110 of the system 100 of FIG. 1.

The WPT pad 200 includes a center coil 202 and four side coils 204a, 204b, 204c, 204d (collectively or generically "204"). The center coil 202 and side coils 204 are adjacent to a ferrite structure 206. In the embodiment, corners next to the side coils 204 each include a ferrite pad 208. In other embodiments, the ferrite pads 208 are not included. In the WPT pad 200 of FIGS. 2A-2C, the center coil 202 and side coils 204 are depicted with a single turn where a slit 210 in the center coil 202 and side coils 204 denote a beginning and end of the one turn on each side of the slit 210. Other embodiments include additional turns.

The side coils 204 are designed to sink magnetic flux emitted by the center coil 202. For example, where current is flowing in one direction in the center coil 202, a pole is created. If current flows in the opposite direction in the side coils 204, an opposite pole is created in each side coil 204. For example, the arrows 212 of FIG. 2B indicate direction of current flow. If current in the center coil 202 flows clockwise, as indicated in FIG. 2B, a north pole is created at the center coil 202. Where current flows counterclockwise in the side coils 204, each side coil 204 creates and opposite pole, or south pole. Thus, magnetic flux created by the center coil 202 flows away from the ferrite structure 206 and returns in the side coils 204.

Beneficially, as much magnetic flux as is created by the center coil 202 is sinked by the side coils 204. In other embodiments, at least a portion of the magnetic flux created by the center coil 202 is not sinked by the side coils 204. The amount of magnetic flux sourced or sinked by a coil depends on the number of turns of the coil and on current in the coil. In one embodiment, a wireless power transfer ("WPT") pad has a center coil 202 and m side coils 204. In the embodiment depicted in FIGS. 2A-2C, the WPT pad 200 includes four side coils 204 so m=4.

Figure 9:
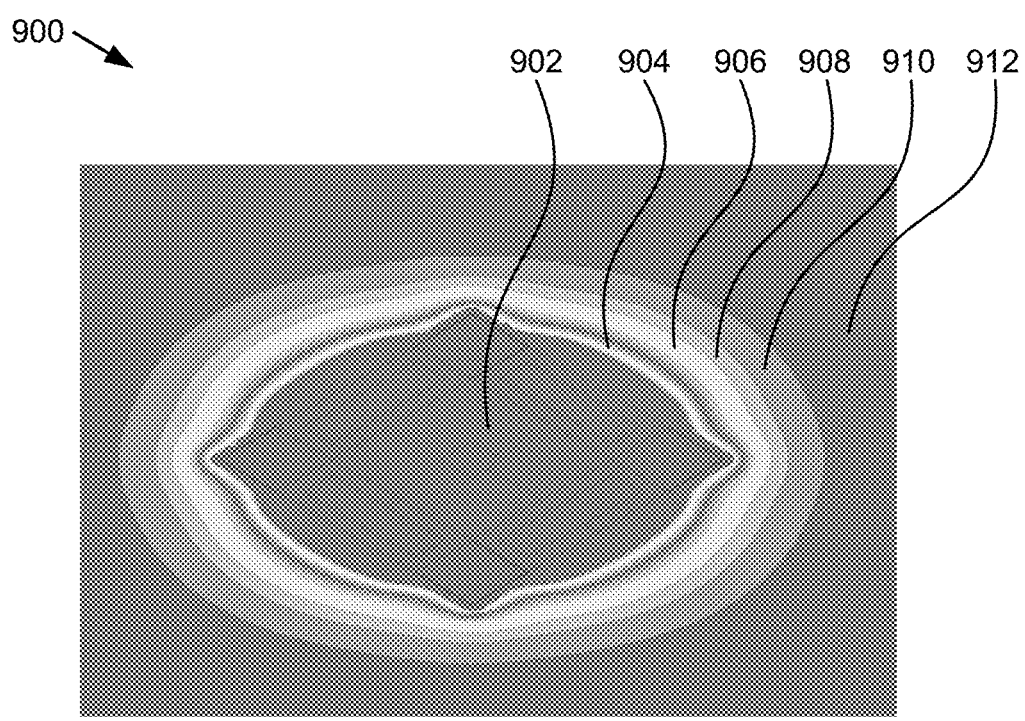
FIG. 9 depicts simulation of the WPT pad depicted in FIGS. 2A-2C.

FIG. 9 depicts simulation 900 of the WPT pad 200 depicted in FIGS. 2A-2C. The simulation 900 includes numbers 902, 904, 906, 908, 910, 912 to indicate different magnetic flux intensities. The approximate magnetic flux intensities are depicted in Table I below:

TABLE I

Magnetic Flux Intensities of FIG. 9

| Number | Magnetic Flux Value (micro Teslas) |
|---|---|
| 902 | 3000 |
| 904 | 2013 |
| 906 | 63.0 |
| 908 | 43.3 |
| 910 | 23.5 |
| 912 | 3.8 |

The simulation balances magnetic flux so the side coils 204 sink the magnetic flux of the center coil 202. As can be seen from FIG. 9 and Table I, magnetic flux intensity follows closely to the center coil 202 and side coils 204 and magnetic flux beyond the WPT pad 200 drops off dramatically away from the WPT pad 200.

Table II is a comparison with other optimized WPT pads. The square pad includes a center coil without side coils. The DD pad includes two rectangular coils positioned next to each other with current flowing in opposite directions in the two coils so that one has a north pole and the other has a south pole. The Flux Sinking Pad is the WPT pad 200 of FIGS. 2A-2C.

Max. Su is maximum apparent power and for a given system design is the product of a maximum open circuit voltage and a corresponding short circuit current generated in a secondary pad of the system when the primary pad is excited. Apparent power is voltage magnitude multiplied by current magnitude and has units of volt-amperes ("VA"). Apparent power is typically made up of components of real power P, with units of watts, and reactive power with units of volt-amperes-reactive ("VAR"). Bmax, 0.8 m is measured in micro Teslas ("µT") and is defined as the maximum leakage magnetic field produced by a system at a distance of 0.8 meters from a line joining the centers of the primary and secondary pads. Scaled Su is a scaled version of the Max. Su in the first line of Table II and is based on a Bmax, 0.8 m of 27.0 µT. Note that there is not a linear relationship between Max. Su and Scaled Su when reducing power in a coil to get 27 µT at 0.8 meters from the center of the WPT pad. The PΦ, 0.8 m metric is a ratio of leakage magnetic field at a certain distance (0.8 m) to the amount of power that can be transferred by a particular design. A lower value indicates a better pad design with lower leakage field generation. The magnetic flux density is squared to compensate for the non-linear relationship between Bmax, 0.8 m and the Scaled Su.

Note that the Scaled Su for the WPT pad 200 at 361.9 kVA is much higher than the Scaled Su for the square pad at 73.8 kVA and DD pad at 138.8 kVA. This signifies that for a magnetic field strength of 27 the WPT pad 200 wirelessly transmits much more power than the other two WPT pads. The PΦ, 0.8 m indicates that there is much less flux leakage for the WPT pad 200 of FIG. 2 than for the other WPT pad designs.

TABLE II

Comparison with Optimized WPT Pads

| Parameters | Units | Square Pad | DD Pad | Flux Sinking Pad |
|---|---|---|---|---|
| Max. Su | kVA | 78.8 | 160.8 | 433.7 |
| Bmax, 0.8 m | µT | 27.8 | 30.7 | 29.41 |
| Scaled Su | kVA | 73.8 | 138.8 | 361.9 |
| PΦ, 0.8 m | (µT)²/kVA | 9.8 | 5.8 | 1.99 |

Figure 3:
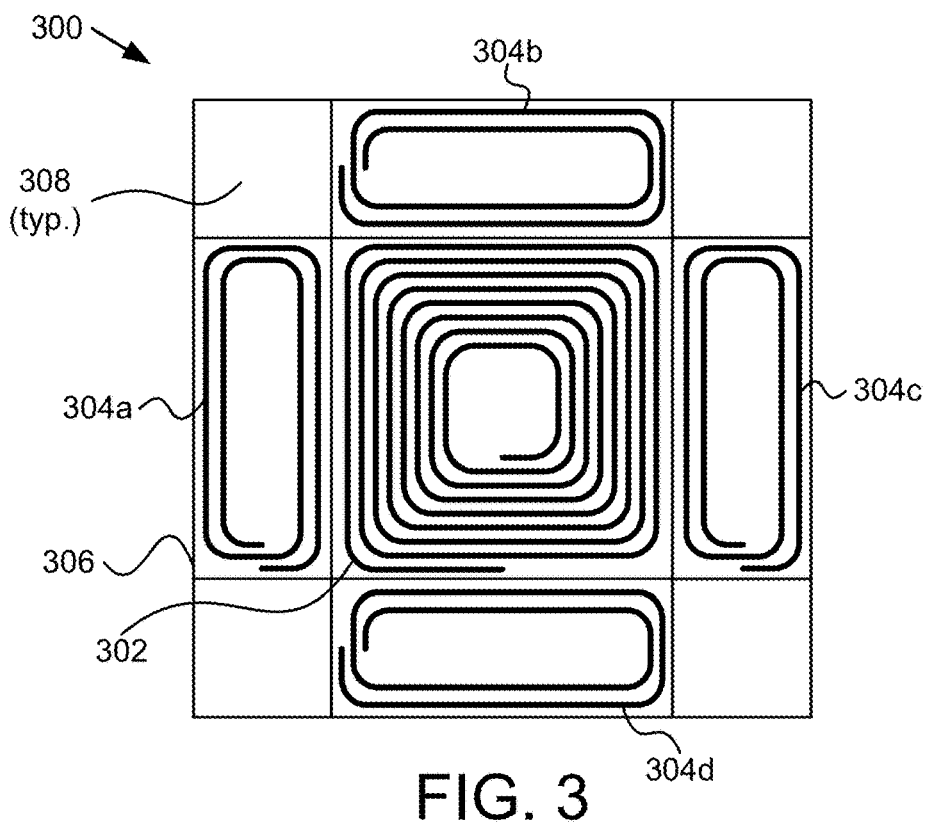
FIG. 3 is a top view of another embodiment of a square WPT pad for wireless power transfer with active field cancellation using multiple magnetic flux sinks.

FIG. 3 is a top view of another embodiment of a square WPT pad 300 for wireless power transfer with active field cancellation using multiple magnetic flux sinks. In some embodiments, the WPT pad 300 of FIG. 3 is substantially similar to the primary pad 102 of FIG. 1. The WPT pad 300 includes a center coil 302 and side coils 304a, 304b, 304c, 304d (collectively or generically "304") adjacent to a ferrite structure 306. Corner ferrite pads 308 may or may not be included.

The center coil 302 includes eight turns and each of the side coils 304 includes eight turns. In the embodiment, there are four side coils 304a-d. Where there are n turns for each coil 302, 304 and m side coils 304, a generic equation for a relationship between the center coil 302 and a side coil 304 is as follows:

$$n_c * i_c = m * n_s * i_s \quad (1)$$

where $i_c$ is current magnitude in the center coil 302, $i_s$ current magnitude in a side coil 304, $n_c$ is turns of the center coil and $n_s$ is turns of a side coil 304. Where the current $i_c = i_s$, $n_c = 8$ and $n_s = 2$ and m=4, then:

$$8 * * i_c = 4 * 2 * i_s \quad (2)$$

$$8 * (i_s) = 8 * i_s \quad (3)$$

When the current in the center coil 302 is the same as the current in the side coils 302, flux of the center coil 302 is sinked by the side coils 304 where one fourth of the magnetic flux generated by the center coil 302 is sinked by a particular side coil (e.g. 304a). Where current in the center coil 302 is increased, current in the side coils 304 may increase proportionately to maintain the four-to-one relationship to sink all of the magnetic flux of the center coil 302.

Where current in the center coil 302 is increased while current in the side coils 302 remains constant or increases at a lower rate, not all of the magnetic flux generated by the center coil 302 is sinked by the side coils 304, which may be beneficial in certain circumstances. For example, increasing current in the center coil 302 beyond the ratio of equation (1) may result in additional leakage flux that is still below acceptable regulatory limits. In addition, the side coils 304 may be designed to maintain leakage flux below a particular limit while not sinking all of the magnetic flux of the center coil 302.

Typically, the center coil 302 is designed to wirelessly transfer a particular amount of power, which dictates a particular amount of current. The side coils 304 may be designed to handle less power, which depends on the number of side coils 304 for the WPT pad 300. The side coils 304 may be designed to reduce leakage flux to within certain tolerances and may be designed to have a maximum current of each of the side coils 304 so that not all of the magnetic flux of the center coil 302 is sinked by the side coils 304. In other embodiments, the side coils 304 are designed to sink all of the magnetic flux of the center coil 302 at a particular power level, such as a nominal power level, while the center coil 302 may be designed to go beyond the nominal power level for certain conditions. One of skill in the art will recognize other ways to design the side coils 304 with respect to the center coil 302 to sink all of the magnetic flux of the center coil 302 or to allow for additional magnetic flux from the center coil 302 that is not sinked by the side coils 304.

Figure 4:
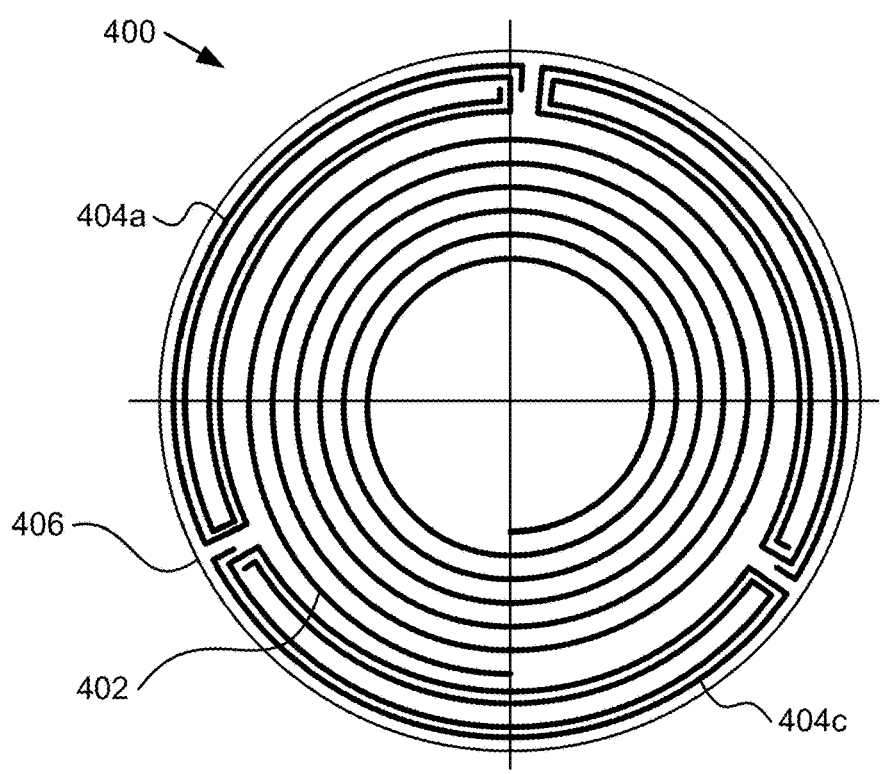
FIG. 4 is a top view of another embodiment of a round WPT pad for wireless power transfer with active field cancellation using multiple magnetic flux sinks.

FIG. 4 is a top view of another embodiment of a round WPT pad 400 for wireless power transfer with active field cancellation using multiple magnetic flux sinks. In some embodiments, the WPT pad 400 of FIG. 4 is substantially similar to the primary pad 102 of FIG. 1. The WPT pad 400 includes a center coil 402, side coils 404a, 404b, 404c (collectively "404") and a ferrite structure 406. The center coil 402, in some embodiments, is round with spiral-shaped windings with six turns. The side coils 404, in the depicted embodiment, are arc-shaped with a radius that appropriate to surround the center coil 402 and each include two windings. In other embodiments, the side coils 404 are rectangular. In the depicted embodiment, to sink all of the magnetic flux of the center coil 402, current in each of the side coils 404 would equal the current in the center coil 402. To reduce current in the side coils 404, the number of turns of each side coil 404 may be increased. In other embodiments, WPT pads include other shapes, such as a rectangle, pentagon, a hexagon, etc. In other embodiments, a WPT pad may include multiple center coils, each with side coils. One of skill in the art will recognize other WPT pad designs with a center coil and side coils designed to sink magnetic flux from the center coil.

Figure 5:
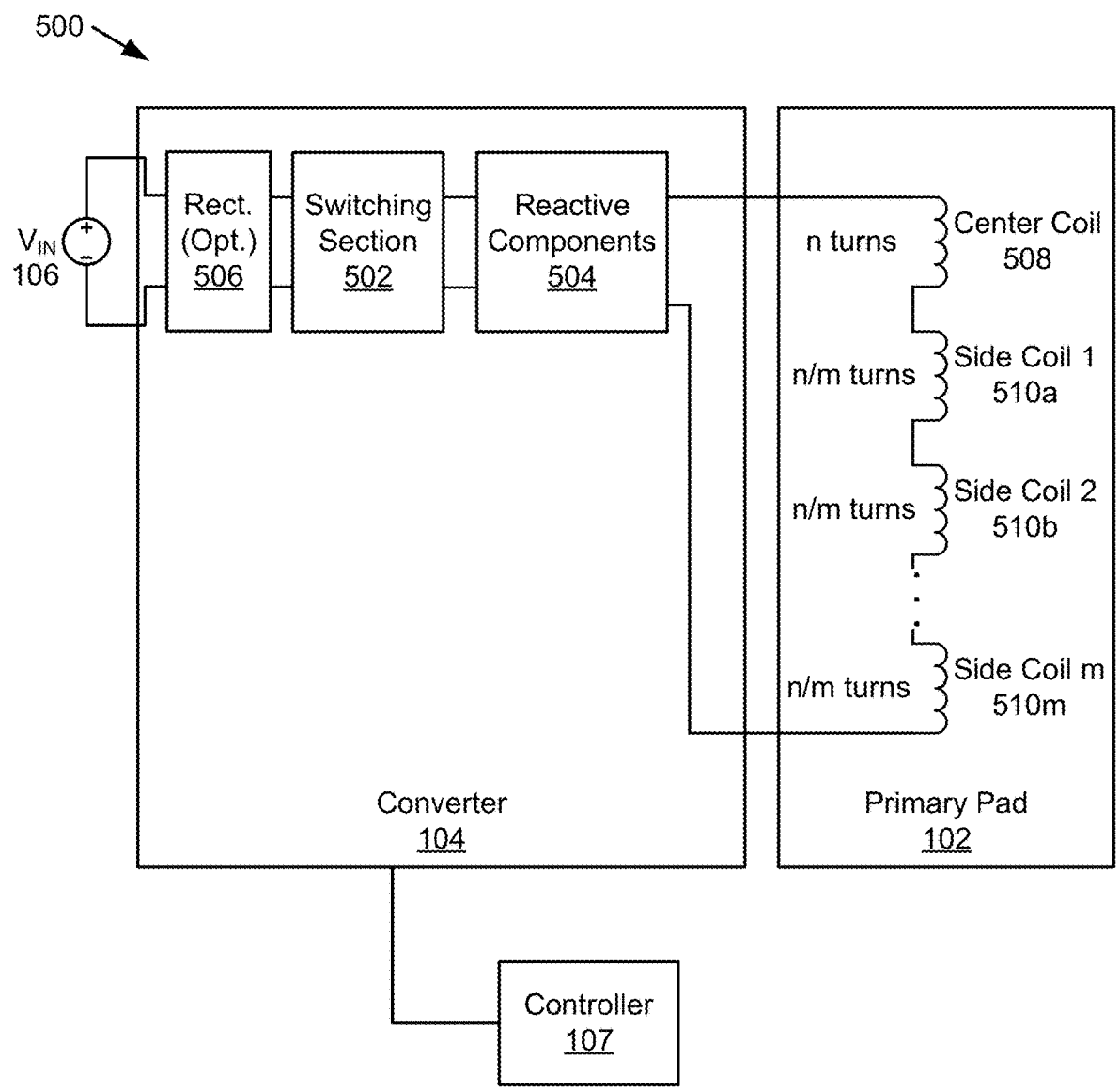
FIG. 5 is a schematic block diagram illustrating one embodiment of a converter with a center coil and side coils of a primary pad.

FIG. 5 is a schematic block diagram illustrating one embodiment 500 of a converter 104 with a center coil 508 and side coils 510a-d (collectively or generically "508") of a primary pad 102 where a controller 107 controls switching of a switching section 502. The primary pad 102 may be substantially similar to any of the WPT pads 200, 300, 400 described above or other shaped WPT pad. The converter 104 includes a switching section 502, which includes switches configured to generate an AC waveform to be transmitted to the primary pad 102. The switching section 502, in some embodiments, is configured as an H-bridge. The switching section 502 is connected to reactive components 504 such as one or more inductors and, in some embodiments, one or more capacitors.

In some embodiments, the switching section 502, reactive components 504 and coils of the primary pad 102 form an inverter that generates an AC waveform at a switching frequency from a DC input. In other embodiments, the converter 104 includes a rectifier 506 that converts AC power from a power source 106 to DC power. In other embodiments, the power source 106 provides DC power and the rectifier 506 is not included.

In the embodiment, the center coil 508 and the plurality of side coils 510 are connected in series. In the embodiment, the current in the center coil 508 is equal to the current in each of the side coils 510 so to maintain the relationship of equation (1), the turns of the side coils 510 are adjusted. In one example, where the center coil 508 includes n turns, each of the side coils 510 may have n/m turns thus the relationship of equation (1) is maintained. Other designs may have different ratios between turns of the center coil 508 and turns of the side coils 510. so that all of the magnetic flux from the center coil 508 is not sinked by the side coils 510. In the embodiment 500 of FIG. 5, as current in the center coil 508 changes, current in the side coils 510 increase proportionately. In the embodiment, the side coils 510 are wound opposite the center coil 508 to cause current for the side coils 510 to be opposite current in the center coil 508.

Figure 6:
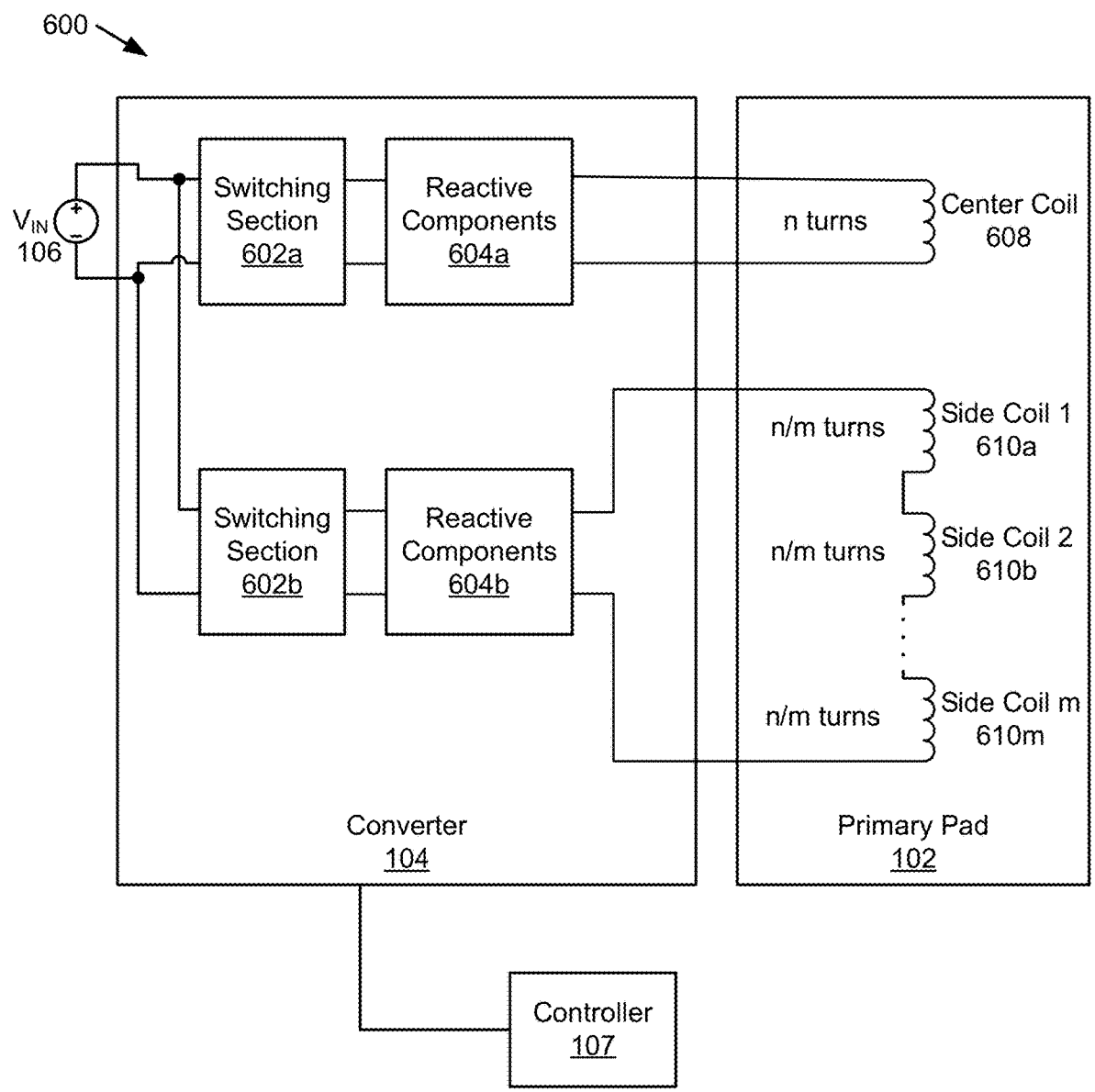
FIG. 6 is a schematic block diagram illustrating one embodiment of a converter with two switching sections where one feeds a center coil and the other feeds side coils of a primary pad.

FIG. 6 is a schematic block diagram illustrating one embodiment 600 of a converter 104 with two converter sections where a first converter section includes a first switching section 602a and reactive components 604a that feed a center coil 608 of a primary pad 102 and the second converter section includes a second switching section 602b and reactive components 604b that feed side coils 610 of the primary pad 102. As with the example of FIG. 5, each switching section 602 is connected to reactive components 604, which then feed the center coil 608 or side coils 610. The controller 107 controls switching in the switching sections 602a, 602b and may control switching separately so that current from the first switching section 602a may change independently from current from the second switching section 602b.

As with the embodiment 500 of FIG. 5, the power source 106 may provide AC or DC power and the converter 104 may or may not include a rectifier (not shown). An advantage of the design of the embodiment 600 of FIG. 6 is that current in the side coils 610 may increase to a side coil current limit while current in the center coil 608 may increase to a value where not all of the magnetic flux of the center coil 608 is sinked by the side coils 610. In the embodiment of FIG. 6, the side coils are connected in series. As with the embodiment 500 of FIG. 5, the center coil 608 includes n turns, each of the side coils 610 may have n/m turns. Thus, the relationship of equation (1) is maintained when the switching sections 602a, 602b provide the same amount of current.

In other embodiments, a multi-winding transformer may be used to provide current to the side coils 610. Other embodiments include other methods of generating a different amount of current for the side coils 610 than for the center coil 608. In other embodiments, the center coil 608 and each side coil 610 is fed from a separate converter section, each with a switching section 602 and reactive components 604 and a multi-winding transformer is not included. One of skill in the art will recognize other current splitting methods.

Figure 7:
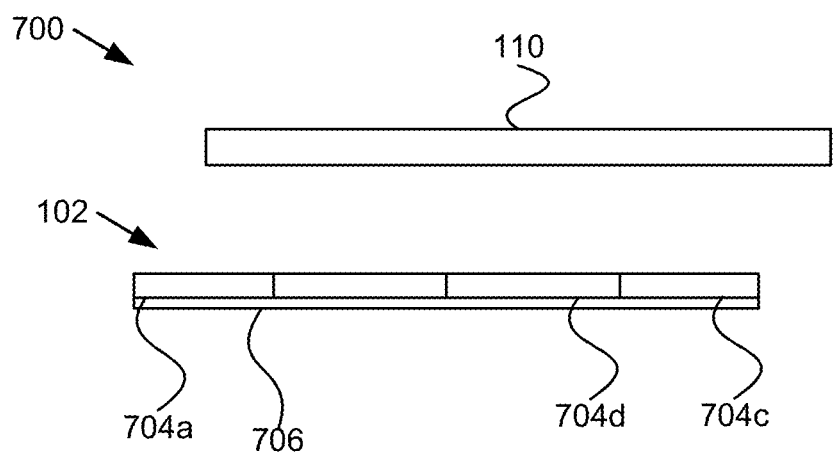
FIG. 7 is a side view of an embodiment of a primary pad and an offset secondary pad.

FIG. 7 is a side view of an embodiment 700 of a primary pad 102 and an offset secondary pad 110. The side view of the primary pad 102 depicts side coils 704a, 704d, 704c similar to side coils 204a, 204d, 204c of FIG. 2, side coils 304a, 304d, 304c of FIG. 3, etc., and a ferrite structure 706. Where the secondary pad 110 is offset from the primary pad 102, current in the side coils 704 may be adjusted to sink more or less magnetic flux to compensate for the offset. For example, sinking of magnetic flux in the side coil 704c in the direction of the offset may be reduced while sinking of magnetic flux in the side coil 704a opposite the offset may be increased.

Figure 8:
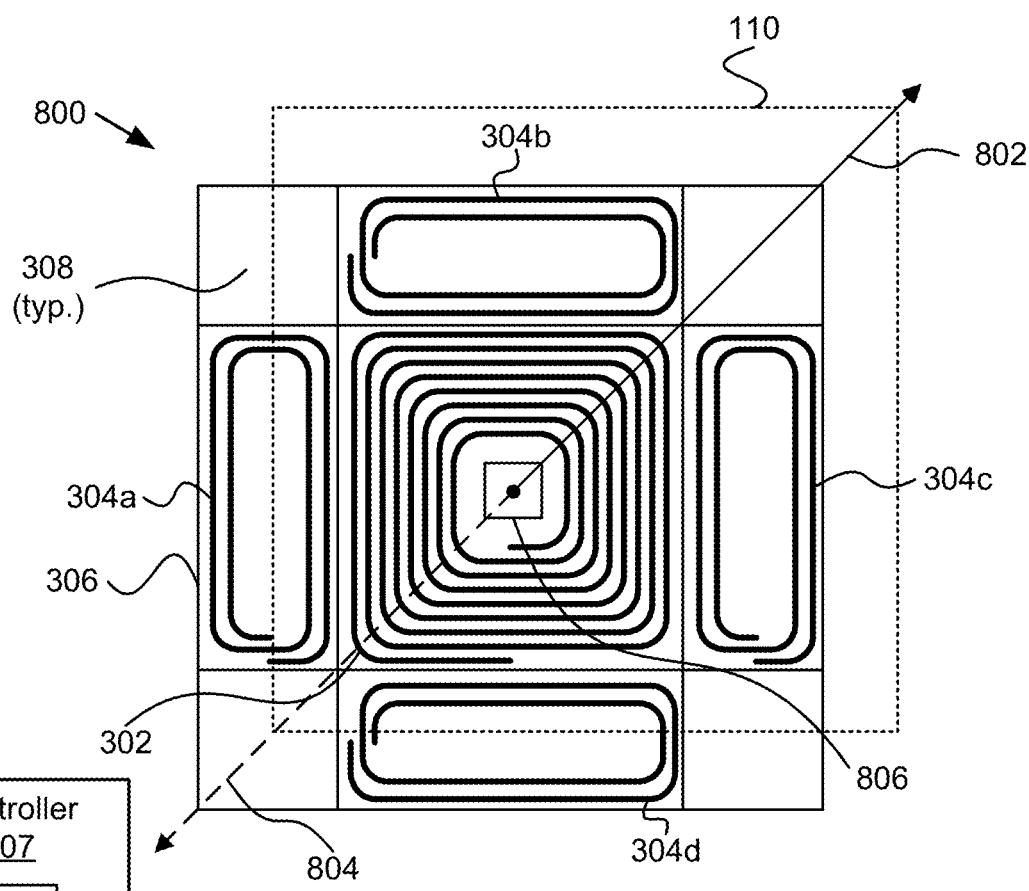
FIG. 8 is a top view the embodiment of the primary pad depicted in FIG. 3 and an offset secondary pad where offset vectors are depicted.

FIG. 8 is a top view the embodiment 800 of the WPT pad 300 depicted in FIG. 3 and an offset secondary pad 110 where offset vectors 802, 804 are depicted. The center coil 302, side coils 304 and optional corner ferrite pads 308 are depicted for the WPT pad 300 and the secondary pad 110 is depicted with dashed lines and is offset from the WPT pad 300. Other WPT pads (e.g. 200, 400, etc.) may also be used.

A first vector 802 is in the direction of the offset of the secondary pad 110 and a second vector 804 is 180 degrees offset from the first vector 802. In the embodiment, current in the top side coil 304b and right side coil 304c may be changed to sink less magnetic flux and current in the bottom side coil 304d and left side coil 304a may be changed to increase sinking of magnetic flux. Changing sinking of the magnetic flux of various side coils 304 may be used to compensate for offset of the secondary pad 110 with respect to the WPT pad 300. In some embodiments, a position sensor 806 provides position information and the controller 107 includes a field modifier 808 configured to use information from the position sensor 806 to sense a position of a receiver, such as the secondary pad 110, and adjust current in the side coils 304 to compensate for misalignment of the WPT pad.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A wireless power transfer ("WPT") pad comprising:
a ferrite structure;
a center coil positioned adjacent to the ferrite structure; and
a plurality of side coils positioned around a perimeter of the center coil and on each side of the perimeter of the center coil and positioned adjacent to the ferrite structure,
wherein the plurality of side coils are shaped to conform to the perimeter of the center coil,
wherein a direction of a current flow of the center coil is opposite to a direction of a current flow in each of the plurality of side coils such that current flowing in a portion of the center coil adjacent to a portion of a side coil of the plurality of side coils is in a same direction as current flowing in the portion of the side coil, and
wherein, for each of the plurality of side coils and the center coil, current in the center coil and current in each of the plurality of side coils are controlled such that a product of the current in the center coil and a number of turns of the center coil is equal to or greater than a product of the current in each of the plurality of side coils, a quantity of the plurality of side coils, and a number of turns of the side coil of the plurality of side coils.

2. The WPT pad of claim 1, wherein the ferrite structure comprises a planar surface and the center coil and the plurality of side coils are wound parallel to the planar surface.

3. The WPT pad of claim 1, wherein, for a switching frequency of the current in the center coil and the current in each of the plurality of side coils, wherein the direction of the current flow of the center coil being opposite the direction of the current flow in each of the plurality of side coils comprises the current in the center coil being 180 degrees out of phase with the current in each of the plurality of side coils.

4. The WPT pad of claim 1, wherein the center coil is in a square or rectangular shape in a direction planar to the ferrite structure and has four sides and the plurality of side coils comprises four side coils and each side coil is positioned on a side of the center coil and is shaped to extend along the side of the center coil.

5. The WPT pad of claim 1, wherein the center coil is circular and each of the plurality of side coils are arc-shaped and are spaced in a circular pattern around the center coil.

6. The WPT pad of claim 1, wherein a side of each of the plurality of side coils is next to the center coil and the plurality of side coils are evenly spaced around the center coil and each of the plurality of side coils is shaped to conform to a section of the perimeter of the center coil where each of the plurality of side coils is located.

7. The WPT pad of claim 1, further comprising a converter connected to the center coil and each of the plurality of side coils, wherein the converter provides current to the center coil and each of the plurality of side coils and wherein the converter controls the current to the center coil and controls the current to each of the plurality of side coils to maintain magnetic flux from the center coil and the plurality of side coils to be below a regulatory limit.

8. The WPT pad of claim 7, wherein the center coil and the plurality of side coils are connected in series.

9. The WPT pad of claim 7, wherein the converter comprises a first converter section that provides the current to the center coil and a second converter section that provides the current to each of the plurality of side coils, wherein a current output of the first converter section is equal to or greater than a current output of the second converter section and wherein the current output of the second converter section is split equally between the plurality of side coils.

10. The WPT pad of claim 1, further comprising:
a position sensor configured to sense offset of a receiver with respect to the center coil in a direction away from a center of the center coil; and
a field modifier configured to reduce current in a side coil of the plurality of side coils in the direction of the offset of the receiver and to increase current in a side coil of the plurality of side coils opposite the direction of the offset of the receiver.

11. The WPT pad of claim 10, wherein the offset of the receiver is in a direction from the center of the center coil and forms a first direction vector with an angle that is between two vectors toward each of two side coils of the plurality of side coils and the field modifier reduces current in the two side coils, and wherein a second direction vector opposite the first direction vector is between two vectors toward each of two additional side coils of the plurality of side coils and the field modifier increases current in the two additional side coils.

12. A wireless power transfer ("WPT") pad comprising:
a ferrite structure comprising a planar surface;

a center coil positioned adjacent to the ferrite structure; and a plurality of side coils positioned around a perimeter of the center coil and on each side of the perimeter of the center coil and positioned adjacent to the ferrite structure, wherein the center coil and the plurality of side coils are wound parallel to the planar surface of the ferrite structure, a side of each of the plurality of side coils is next to the center coil and the side coils are evenly spaced around the center coil, wherein the plurality of side coils are shaped to conform to the perimeter of the center coil, wherein a direction of current flow of the center coil is opposite to a direction of a current flow in each of the plurality of side coils such that current flowing in a portion of the center coil adjacent to a portion of a side coil of the plurality of side coils is in a same direction as current flowing in the portion of the side coil, and wherein, for each of the plurality of side coils and the center coil, current in the center coil and current in each of the plurality of side coils are controlled such that a product of the current in the center coil and a number of turns of the center coil is equal to or greater than a product of the current in each of the plurality of side coils, a quantity of the plurality of side coils, and a number of turns of the side coil of the plurality of side coils.

13. The WPT pad of claim 12, wherein, for a switching frequency of the current in the center coil and the current in each of the plurality of side coils, wherein the direction of the current flow of the center coil being opposite the direction of the current flow in each of the plurality of side coils comprises the current in the center coil being 180 degrees out of phase with the current in each of the plurality of side coils.

14. The WPT pad of claim 12, further comprising a converter connected to the center coil and each of the plurality of side coils, wherein the converter provides current to the center coil and each of the plurality of side coils and wherein the converter controls the current to the center coil and controls the current to each of the plurality of side coils to maintain magnetic flux from the center coil and the plurality of side coils to be below a regulatory limit.

15. The WPT pad of claim 14, wherein the center coil and the plurality of side coils are connected in series.

16. The WPT pad of claim 14, wherein the converter comprises a first converter section that provides the current to the center coil and a second converter section that provides the current to each of the plurality of side coils, wherein a current output of the first converter section is equal to or greater than a current output of the second converter section and wherein the current output of the second converter section is split equally between the plurality of side coils.

17. The WPT pad of claim 12, further comprising:
a position sensor configured to sense offset of a receiver with respect to the center coil in a direction away from a center of the center coil; and
a field modifier configured to reduce current in a side coil of the plurality of side coils in the direction of the offset of the receiver and to increase current in a side coil of the plurality of side coils opposite the direction of the offset of the receiver.

18. The WPT pad of claim 17, wherein the offset of the receiver is in a direction from the center of the center coil and forms a first direction vector with an angle that is between two vectors toward each of two side coils of the plurality of side coils and the field modifier reduces current in the two side coils, and wherein a second direction vector opposite the first direction vector is between two vectors toward each of two additional side coils of the plurality of side coils and the field modifier increases current in the two additional side coils.

19. A system comprising:
a ferrite structure;
a center coil positioned adjacent to the ferrite structure;
a plurality of side coils positioned around a perimeter of the center coil and on each side of the perimeter of the center coil and positioned adjacent to the ferrite structure, wherein the plurality of side coils are shaped to conform to the perimeter of the center coil, and wherein a direction of a current flow of the center coil is opposite to a direction of a current flow in each of the plurality of side coils such that current flowing in a portion of the center coil adjacent to a portion of a side coil of the plurality of side coils is in a same direction as current flowing in the portion of the side coil, wherein, for each of the plurality of side coils and the center coil, current in the center coil and current in each of the plurality of side coils are controlled such that a product of the current in the center coil and a number of turns of the center coil is equal to or greater than a product of the current in each of the plurality of side coils, a quantity of the plurality of side coils, and a number of turns of the side coil of the plurality of side coils; and
a converter connected to the center coil and each of the plurality of side coils, wherein the converter provides current to the center coil and each of the plurality of side coils and wherein the converter controls the current to the center coil and the plurality of side coils.

* * * * *